INVENTOR
William H. Nutt
By his attorney
Victor Cohl.

June 15, 1937.  W. H. NUTT  2,083,659
SHOE AND METHOD OF MAKING THE SAME
Filed Nov. 26, 1935  4 Sheets-Sheet 4

INVENTOR
William H. Nutt
By his attorney
Victor Cobb

Patented June 15, 1937

2,083,659

UNITED STATES PATENT OFFICE 2,083,659

SHOE AND METHOD OF MAKING THE SAME

William H. Nutt, Beverly, Mass., assignor to United Shoe Machinery Corporation, Paterson, N. J., a corporation of New Jersey Application November 26, 1935, Serial No. 51,635

35 Claims. (Cl. 12—142)

This invention relates to the art of making shoes and to improvements in shoes and shank pieces therefor.

Objects of the invention are to provide an improved method of making shoes having no outsoles or extremely narrow outsoles at their shank portions, to provide improved shoes embodying such constructions, and to provide improved shank pieces for shoes.

To the attainment of these objects and in accordance with one aspect of the invention a central groove or slot is formed in a shank piece for a shoe, the groove as herein illustrated being formed in the outer surface of the shank piece and extending longitudinally thereof rearwardly at least to the heel breast line of the shoe. The shank piece is assembled on a last with an insole member and a shoe upper, the insole member being the full length of the shoe bottom or, if desired, only as long as the forepart thereof and the marginal portions of the upper being cut fuller than normal at the shank portion of the shoe, and being pulled over the last in the usual manner. The upper is secured in lasted relation to the insole at the forepart of the shoe and, at the shank portion, the lining of the upper (which as herein illustrated is cut the usual width) is worked over the shank piece and permanently secured thereto, for example, by metallic fastenings. The outer or full layer of the upper is worked into lasted position relatively to the lining and shank piece and is secured in such position, for example, by cement. Before the cement has fully set the marginal portions of the outer layer are tucked into the central groove in the shank piece, thereby completely covering the shank portion of the shoe bottom with upper material. A half-length outsole may be secured to the forepart of the shoe by cement or otherwise and a wood heel attached to the shank piece to complete the construction of the shoe. If desired the outsole may extend across the shank piece to the heel breast line of the shoe and have its shank portion substantially reduced in width to form what is commonly known as a fiddle shank, the narrow portion of the outsole covering the seam or opening formed where the upper materials enter the groove in the shank piece.

The shank piece herein illustrated is formed of relatively stiff inflexible material to provide a suitable support for the shank portion of the foot and it is shaped to conform in outline to the periphery of the shank and heel portions of a last bottom so that it may also serve as a sole member to preserve the shape of the rear portion of the shoe. Moreover, the inner surface of the illustrated shank piece conforms or is complemental to the bottom of the last for the shoe in which the shank piece is to be incorporated and the outer surface of the heel portion of the illustrated shank piece is shaped to fit the depression or cup in the attaching face of a conventional wood heel so that it will not be necessary to perform a heel-seat fitting operation upon the shoe bottom before attaching the heel.

The invention also provides, in accordance with a further feature, a shank piece of relatively inflexible material having a central groove in its outer surface to receive the marginal portions of a shoe upper cut fuller than normal at the shank portion of the shoe, thereby permitting the use of a half-length outsole at the forepart of the shoe or, if desired, an outsole extending to the heel breast line and having an extremely narrow shank portion.

An integral flange or counter portion may, in accordance with another feature of the invention, be provided on the heel portion of the shank piece, the counter being preferably formed to fit the sides of the last and thereby being adapted to eliminate looseness of the shoe on the foot which, in many cases, tends to cause shoes to slip or run over at the heels. The use of the combined shank piece and counter also eliminates the necessity of fitting and adjusting the flanges of a usual counter in order to obtain a proper heel seat on the shoe bottom. Since shank pieces of this type form permanent parts of the shoe bottom there is no danger of their becoming displaced during the wear of the shoe as is sometimes the case with metal shank pieces or stiffeners which are secured in position by tacks.

In accordance with still another feature the invention provides an improved shoe the shank portion of which is light and neat in appearance and yet is sufficiently rigid to support the foot properly. The illustrated shoe may have only a half-length outsole or an outsole with a narrow shank portion terminating at the heel-breast line. A wood heel is attached directly to the shank piece without a heel-seat fitting operation and, in those shoes having a combined shank piece and counter, the upper at the heel portion of the shoe will conform closely to the shape of the last and retain this shape during the life of the shoe, thereby tending to eliminate slipping and running over at the heel portion of the shoe.

The invention further consists in various other improvements in the art of making shoes and shank pieces and various other features of shoe and shank piece construction hereinafter described with reference to the accompanying drawings and specifically pointed out in the claims.

Figures 1, 2, 3, 4, 5:
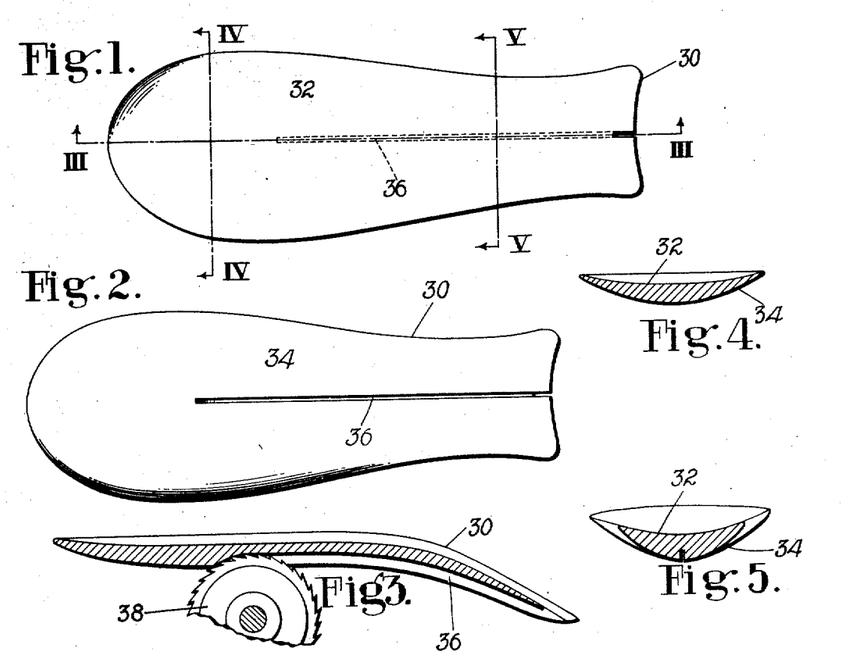
Fig. 1 is a plan view of the inner side of a shank piece embodying the present invention.
Fig. 2 is a plan view of the outer side of the shank piece.
Fig. 3 is a longitudinal sectional view taken on the line III—III of Fig. 1 and showing one manner of forming a groove or slot in the shank piece.
Fig. 4 is a transverse sectional view taken on the line IV—IV of Fig. 1.
Fig. 5 is a transverse sectional view on the line V—V of Fig. 1.
Figure 6:
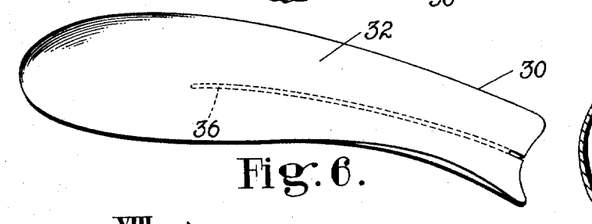
Fig. 6 is a perspective view showing the inner surface of the shank piece.

In making a shoe in accordance with the method illustrated herein a stiff and relatively inflexible shank piece 30 is formed either from solid wood on a wood turning machine or, if desired, by molding mobile material such as plastic wood or fiber which will harden to produce a relatively rigid member for supporting the bottom of a foot in a shoe. As illustrated in Figs. 1 to 5, inclusive, the shank piece 30 preferably conforms in outline to the periphery of the shank and heel portions of a last bottom and on its inner face 32 (Figs. 1 and 6) is hollowed out to conform substantially to the shape of a last bottom. The outer surface 34 (Fig. 2) of the shank piece is rounded at its rear portion to fit the cup or depression in the attaching face of a wood heel and the forward portion of this surface is curved more than the inner surface 32, as shown in Fig. 5, to produce the proper shape at the shank portion of the shoe and to obtain the proper thickness for the shank piece.

After the shank piece has been shaped in the manner described, a central longitudinal groove or slot 36 is formed therein, the groove preferably extending from the front end of the shank piece rearwardly a short distance beyond the heel-breast line and extending into the shank piece for a distance equal to about half the thickness of its central portion. If the shank piece is formed from a solid piece of wood the groove may be cut therein by a rotary cutter or saw 38, as shown in Fig. 3 or, if the shank piece is molded from plastic wood or similar material, for example, between a last and a properly shaped outer mold, the groove may be formed during the molding operation. The type of shank piece illustrated in Figs. 1 to 6, inclusive, is ready to be utilized in a shoe after the groove has been formed therein.

Figure 9:
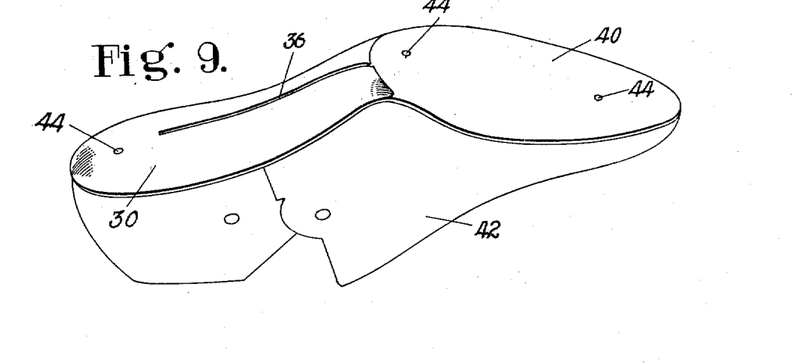
Fig. 9 is a perspective view of the shank piece of Fig. 1 mounted with an insole member on a last.
Figure 10:
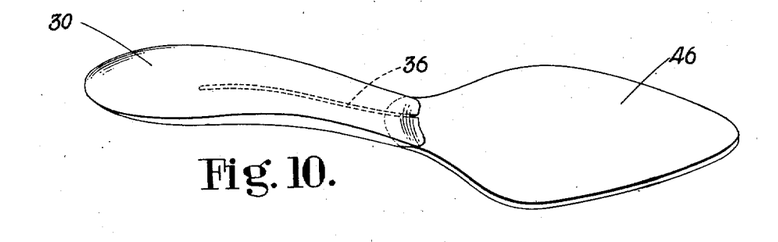
Fig. 10 is a perspective view similar to Fig. 6 showing the shank piece attached to an insole member to form a complete sole unit.

In making the shoe, the shank piece is mounted with an insole 40 (Fig. 9) on a last 42 and the members are secured in position on the last bottom by tacks 44. The insole 40 may be a full length insole, as shown in Fig. 9, and the shank piece 30 may be attached to its outer surface by cement with the groove 36 in the shank piece exposed. The shank piece 30 may, however, be secured by cement to a thin flexible forepart insole member 46, if desired, as shown in Fig. 10, since the resulting shoe in so far as the sole portion is concerned will embody the same features and have the same advantages irrespective of whether the construction shown in Fig. 9 or that shown in Fig. 10 is utilized.

Figure 11:
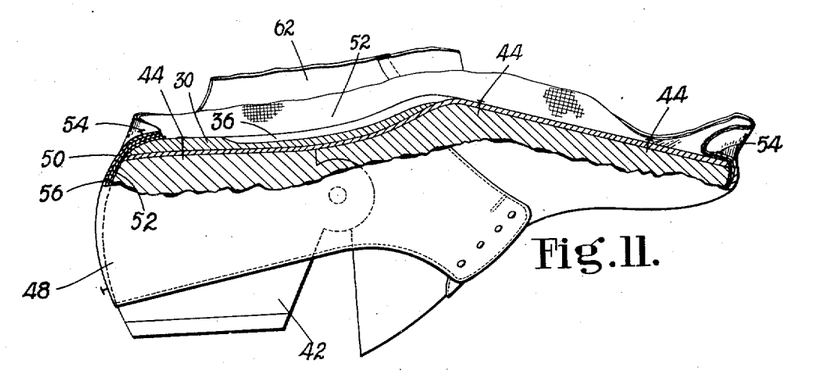
Fig. 11 is a side elevation partly in section showing an upper pulled over the last of Fig. 9.

After the sole unit 30, 40, has been temporarily secured to the last bottom a multi-ply shoe upper 48, comprising an outer leather layer 50 (Fig. 11) and a lining 52, is assembled on the last, pulled over in the usual manner at its heel and toe portions, and secured in such position by tacks 54, a usual counter 56 being introduced between the outer layer and lining before the materials are pulled over. The opposite marginal portions of the outer layer 50 of the upper are cut fuller than normal at the shank portion thereof, the wide portions being indicated in Figs. 11 and 12 by the numeral 62.

The upper is now ready for the lasting operation wherein the opposite marginal portions thereof at the forepart of the shoe are gripped in the usual manner and worked over the margins of the insole member 40. The forepart of the upper may be secured in lasted relation to the insole member by curved staples 58 which extend through the upper materials and curve into the material of the insole member 40 without passing completely therethrough, this operation being preferably performed with the aid of a machine of the type disclosed in United States Letters Patent No. 1,815,297, granted July 21, 1931 on an application filed in the name of George Goddu. The forepart of the upper could, however, be lasted in other ways if desired, for example, it could be lasted by cement or by tacks clinched on the bottom of the last.

Figure 12:
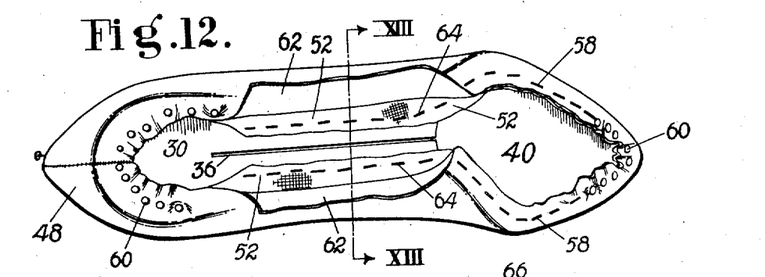
Fig. 12 is a plan view of the shoe after part of the lasting operation has been completed.
Figure 13:
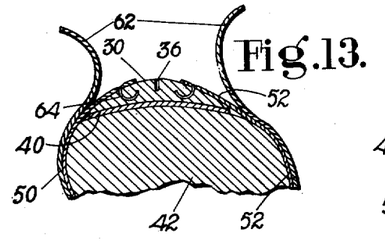
Fig. 13 is a transverse sectional view on the line XIII—XIII of Fig. 12.

At the shank portion of the shoe the two layers 50, 52 of upper materials are lasted separately, as shown in Figs. 12 to 16, inclusive, the lining 52 being first worked into lasted position over the wood shank piece 30 and being secured thereto by curved staples 64 preferably inserted by the machine referred to and at the same time that the forepart of the upper is secured to the insole 40. As shown in Fig. 13 the staples 64 curve into the material of the shank piece 30 without passing completely through and thus serve to hold the lining 52 permanently in lasted position.

Figures 18, 19, 20, 21:
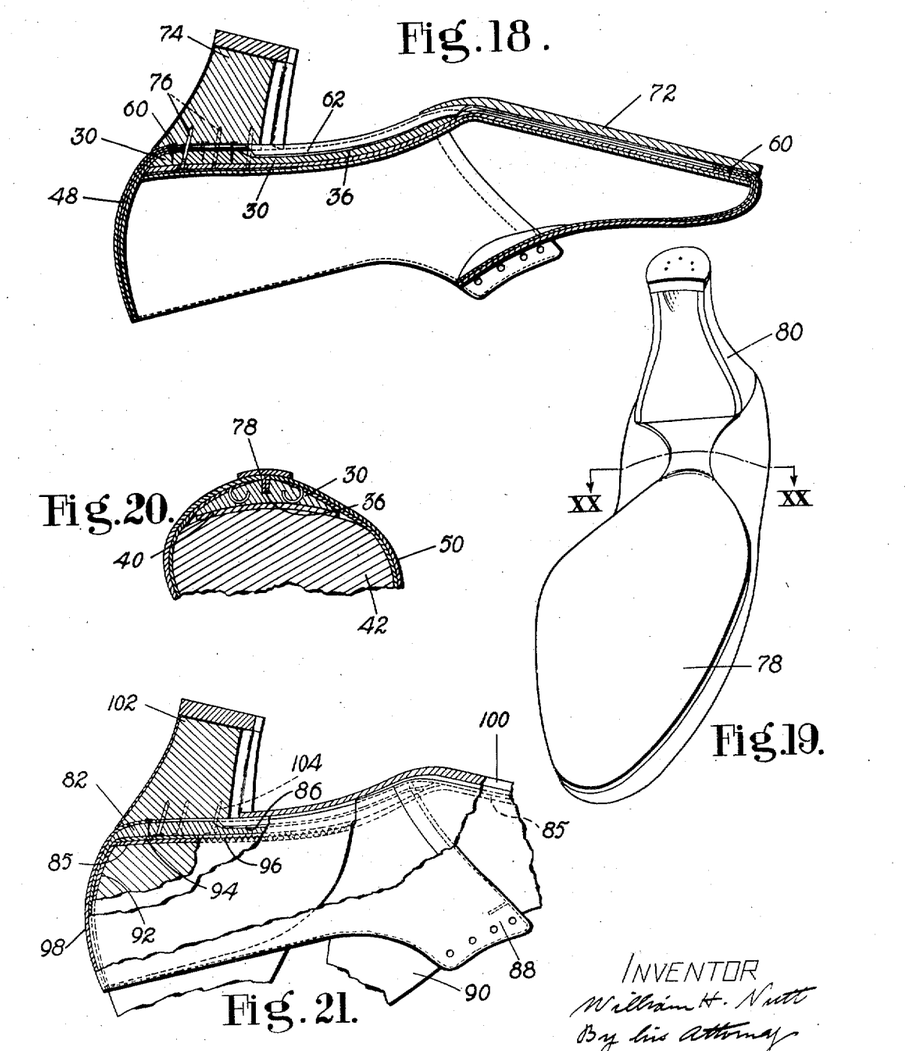
Fig. 18 is a longitudinal sectional view through the shoe.
Fig. 19 is a perspective view of the bottom of a shoe provided with an outsole having a narrow shank extending rearwardly to the heel breast line.
Fig. 20 is a transverse sectional view taken on the line XX—XX of Fig. 19.
Fig. 21 is a side elevation partly in section of a shoe embodying the combined shank piece and counter illustrated in Fig. 7.

The upper at the toe and heel-seat portions of the shoe is next secured in lasted relation to the insole member 40 and the shank piece 30 as shown in Fig. 12. The toe and heel portions of the upper may be lasted in any usual or convenient manner, for example, they may be lasted with the aid of the well-known bed lasting machine, the upper being secured in lasted position by tacks 60 which may be clinched against the toe end of the last by the usual metal plate (not shown) which may be provided thereon. The lasting tacks 60 at the heel end of the shoe will enter the wood shank piece but will not pass completely therethrough, as shown in Fig. 18.

Figure 14:
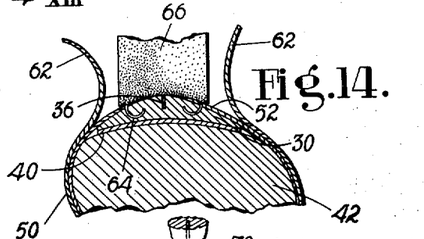
Fig. 14 is a view similar to Fig. 13 showing the overlasted margins of the upper lining being skived to a thin edge.
Figure 15:
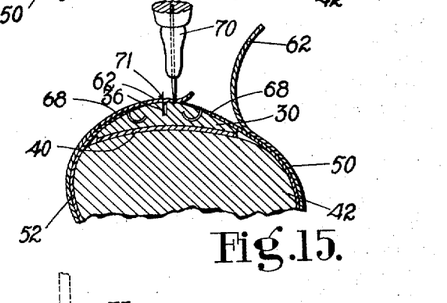
Fig. 15 is a view similar to Fig. 13 showing the trimming of the outer layer of the shoe upper.

The inner marginal portions of the lining 52 at the shank portion of the shoe are next skived to a relatively thin edge to prevent the formation of ridges in the shoe bottom, the skiving operation being performed, for example, by a small diameter emery wheel 66, as shown in Fig. 14. The margin of the lining should not, of course, be skived outwardly as far as the staples 64 and the inner edges of the lining after skiving should preferably be located about one-quarter of an inch away from the slot 36 in the shank piece 30 so as not to interfere with the lasting of the outer layer 50 of the upper. The overlasted portions of the lining 52 are now coated with cement 68 (Fig. 15), preferably rubber cement, and the exposed portion of the shank piece 30 between the opposite edges of the lining is also coated with cement. The wide marginal portions 62 of the outer layer 50 of the upper are pulled over the shank portion of the shoe bottom one at a time, as shown in Fig. 15, preferably with the aid of pincers (not shown) and the margins are trimmed in such a manner as to leave sufficient material to be tucked into the central groove or slot 36 in the wood shank piece 30. The trimming operation may be conveniently accomplished by means of a hand knife 70, as shown in Fig. 15, the back or dull edge of the blade being first drawn along the wide portion 62 of the upper above the slot 36 to form a line or crease 71 which serves as a guide for the trimming cut.

Figure 16:
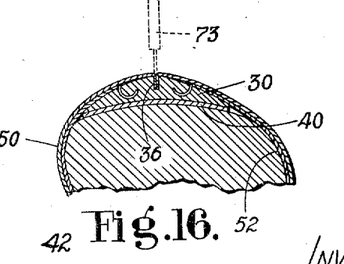
Fig. 16 is a view similar to Fig. 13 showing the tucking of the marginal portions of the upper into the groove in the shank piece.

After the excess portion of the upper margin has been trimmed off, the inner portion thereof is tucked into the central groove 36, as shown in Fig. 16, this being accomplished, for example, by means of any appropriate tool such as that indicated at 73 by dotted lines. The opposite side of the outer layer of the upper is secured in lasted position in the manner just described, the excess portion of the margin being trimmed before its inner portion is tucked into the groove 36, thereby completing the lasting of the upper at the shank portion of the shoe. The inner portions of the upper margins are secured in the groove 36 by means of the cement which was applied to the exposed central portion of the shank piece after the lining was lasted thereto.

Figure 17:
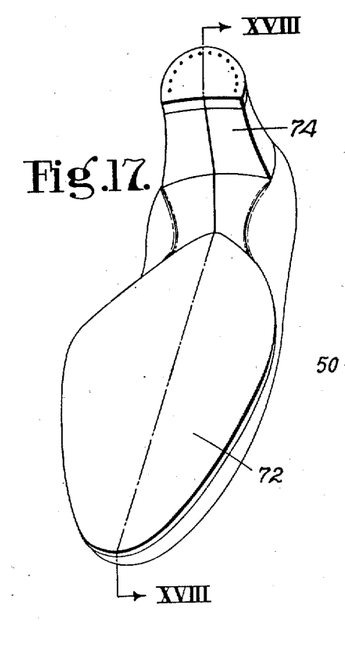
Fig. 17 is a perspective view of the bottom of the finished shoe after a short outsole has been secured to its forepart and a heel has been attached to the shank piece.

The lasted shoe is now ready for the attachment of an outsole and a heel to complete the construction of the shoe. In accordance with the method disclosed in Figs. 11 to 18, inclusive, a half-length outsole 72 (Fig. 17) is applied to the forepart of the shoe bottom and is attached thereto in any suitable manner, preferably by an adhesive such as pyroxylin cement, this operation being performed, for example, on any of the well-known presses adapted for use in adhesively securing outsoles to shoe bottoms. A covered wood heel 74, herein illustrated by way of example as a Cuban heel, is mounted on the heel portion of the wood shank piece 30 and is attached by inside nails 76 (Fig. 18). No heel-seat fitting operation is necessary before attaching the heel 74 because, as described above, the heel-seat portion of the shank piece 30 is shaped to fit the cup or depression in the wood heel and the upper is lasted directly to this portion so that its general shape or curvature remains substantially the same after lasting. Fig. 17 shows how the bottom of the shoe will appear after the attachment of the half-length outsole and the wood heel and Fig. 18 shows the completed shoe in longitudinal section. The relatively inflexible shank piece 30 provides an excellent support for the shank portion of the foot and is covered on the outside by the upper materials which hug the latter in a manner which adds to the attractiveness of the shoe. The use of a half sole at the forepart of the shoe tends to increase its flexibility at the break or ball line and reduces the cost of manufacturing the shoe. The elimination of a heel-seat fitting operation before attaching the wood heel also reduces the cost of the shoe. As shown in Fig. 17 the covered wood heel will have a crease extending heightwise of its breast portion and this crease will coincide with the crease formed at the shank portion of the shoe, thereby giving the shoe a neat and finished appearance.

A modification of the method just described involves the use of a three-quarter length outsole having an extremely narrow shank portion commonly referred to as a fiddle shank, this modification being illustrated in Figs. 19 and 20. As shown in section in Fig. 20, the upper materials are lasted at the shank portion directly to the wood shank piece 30 and the outer extended layer 50 of the upper is tucked into the central groove 36. An outsole 78 is preferably applied by cement such as pyroxylin and extends rearwardly to the heel-breast line of the shoe, the shank portion being reduced in width to form a fiddle shank shoe. The covered wood heel 80 may be attached in the manner described above and, if desired, may be a Louis heel with cover receiving slots in the opposite sides of its breast portion instead of a Cuban heel with a central slot as shown in Fig. 17.

Figure 7:
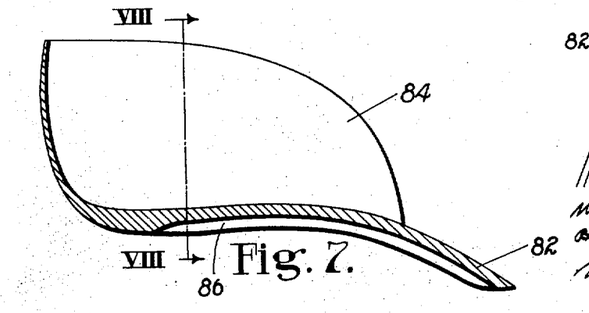
Fig. 7 is a longitudinal sectional view of a shank piece having an integral flange thereon which serves as a counter.
Figure 8:
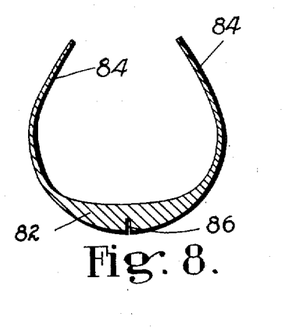
Fig. 8 is a transverse section taken on the line VIII—VIII of Fig. 7.

Referring now to Figs. 7 and 8, a further modification of the invention comprises the construction of a shank piece 82 similar to that shown in Fig. 3 but having formed integrally therewith an upwardly extending flange portion 84 which will serve as a counter for the shoe. This type of shank piece may be made by molding plastic wood or fiber over a last as explained above so that the integral counter portion corresponds exactly to the shape of the heel portion of the last. The shank piece is also provided with a central slot 86 into which the inner marginal portions of the shoe upper may be secured at the shank portion of the shoe and the outer surface of the heel-seat portion of the shank piece is shaped in the molding operation to conform substantially to the depression or cup in a wood heel. In constructing the shoe an insole member 85 (Fig. 21), herein shown as a full-length insole, is assembled in the usual manner with a multi-ply shoe upper 88 on a last 90, the upper comprising a lining 92 and an outer layer 98. In order to cause the lining 92 to be secured smoothly in lasted position at the rear portion of the shoe, that portion of the lining which is to engage the counter on the shank piece may be trimmed off even with the edge of the inner surface of the shank piece and its trimmed edges connected to a heel pad 94 of fabric or similar material by zig-zag stitching 96, thereby forming a pocket into which the rear portion of the last may be inserted and causing the lining to be pulled smoothly into lasted position over the rear portion of the insole when the upper is assembled on the last. The combination wood shank piece and counter 82 is then mounted on the insole and the counter portion inserted between the lining and the outer layer 98 of the upper and the latter is pulled over in the usual manner. The full portion of the lining forwardly of the counter on the shank piece is secured in lasted relation to the shank piece by staples as described above and, after roughening the exposed portion of the lining and applying rubber cement to the entire shank portion of the shoe bottom, the full margins of the outer layer of the upper at the shank portion of the shoe forwardly of the heel seat portion may be trimmed and tucked into the groove 86 in the shank piece. At the forepart of the shoe both plies of the upper may be secured in lasted position by staples as shown in Fig. 12 and the heel seat portion and toe end may be lasted by tacks as described above. An outsole 100 may then be secured to the shoe bottom, for example, by cement, the outsole, as shown, extending rearwardly only to the heel-breast line and having an extremely narrow shank portion although, if desired, a half-length or forepart outsole such as that illustrated in Figs. 17 and 18 may be used. A covered wood heel 102 is attached directly to the heel-seat portion of the shank piece 82 by inside nails 104 to complete the construction of the shoe. As indicated above, the central seam in the breast portion of the covered wood heel should be located to coincide with the crease or seam in the shank portion of the shoe bottom if a half-length outsole is used. A shoe made in accordance with this modification of the invention embodies all the advantageous features of the shoes previously described and in addition has a rigid counter portion adapted to fit the foot properly and to retain its shape during the life of the shoe, thereby preventing slipping at the heel portion of the shoe or running over at the sides.

Having described my invention, what I claim as new and desire to secure by Letters Patent of the United States is:

1. That improvement in methods of making shoes which comprises forming a groove in a shank piece inside its marginal portions, mounting the shank piece with a sole member on a last, securing the marginal portions of a shoe upper in lasted relation to the sole member and shank piece, and inserting the surplus marginal material at the shank portion of the upper in the groove in the shank piece.

2. That improvement in methods of making shoes which comprises forming a central groove in the outer surface of a shank piece, mounting the shank piece with an insole member on a last bottom, cutting the opposite marginal portions of a shoe upper fuller than normal, securing the upper in lasted relation to said insole member and shank piece, and tucking the excess material of the marginal portions of the upper into the groove in the shank piece.

3. That improvement in methods of making shoes which comprises forming a narrow groove longitudinally of the shank portion of a shank and heel piece, said groove extending only part way through said shank and heel piece, assembling the shank and heel piece with an insole on a last bottom, cutting the opposite marginal portions of a shoe upper wider than normal at the shank portion of a shoe, securing the marginal portions of the upper in lasted relation to the insole and shank and heel piece at the sides of the shoe, and securing the excess portions of the upper margins in the groove in the shank and heel piece, thereby causing the opposite sides of the upper to meet at the shank portion of the shoe bottom.

4. That improvement in methods of making shoes which comprises attaching a relatively stiff shank piece having a central groove in its outer face to a relatively flexible insole, securing the forepart of a shoe upper in lasted relation to said insole, permanently securing the opposite margins of the shank portion of the upper in lasted relation to said shank piece, securing the inner portions of said margins in the groove in the shank piece, thereby covering the bottom of the shank portion of the shoe with the upper materials, and lasting the heel portion of the upper directly to the shank piece.

5. That improvement in methods of making shoes which comprises forming a central groove longitudinally of a shank piece, attaching the shank piece to the outer surface of an insole and mounting them on a last, securing the forepart of a shoe upper in lasted relation to said insole, said upper being cut wider than normal at the shank portion of the shoe, securing the marginal portions of the shank portion of the upper in lasted relation to the shank piece, tucking the excess material of said marginal portions into the central groove in the shank piece thereby covering the shank piece at the shank portion of the shoe, and attaching an outsole to the shoe bottom.

6. That improvement in methods of making shoes which comprises shaping a shank piece from relatively inflexible material, forming a central groove therein, mounting the shank piece with an insole member on a last, securing the forepart of a shoe upper in lasted relation to the insole member, lasting the shank portion of the upper directly to the shank piece, and inserting the margins of said portion in the groove in the shank piece.

7. That improvement in methods of making shoes which comprises molding a shank piece from plastic material which sets to form a relatively inflexible member, forming a central groove longitudinally of the outer surface of said shank piece, mounting the shank piece with an insole member on a last with the groove exposed, assembling on the last a shoe upper the shank portion of which is cut fuller than normal, securing the forepart of the upper in lasted relation to the insole member, trimming the shank portion of the upper so that its margins can be inserted in the groove in the shank piece, lasting said margins directly to said shank piece, and tucking the inner portions of said margins in said groove.

2,083,659

8. That improvement in methods of making shoes which comprises attaching a stiff relatively inflexible shank piece having a central groove extending lengthwise of its outer face to the outer surface of a thin flexible insole, mounting the insole with the shank piece exposed on the bottom of a last, cutting the opposite margins of the outer layer of a multi-ply shoe upper fuller than normal at the shank portion thereof, securing the forepart of the upper in lasted relation to the insole, securing the lining of the shank portion of the upper in lasted relation to the shank piece, and pulling the wide portions of said outer layer over the shank piece and tucking the inner margins thereof into the central groove, thereby covering the shank portion of the shoe bottom with the outer layer of the upper materials.

9. That improvement in methods of making shoes which comprises attaching a relatively stiff shank piece to a thin flexible insole, said shank piece having a central slot in its outer face extending rearwardly at least to the heel breast line, assembling the insole and shank piece on a last with a shoe upper the opposite marginal portions of which are cut fuller than normal at the shank portion of the shoe, securing the forepart of the upper in lasted relation to the flexible insole with metallic fastenings, securing the opposite margins of the shank portion of the upper to the shank piece with cement, inserting the excess portions of said margins in the slot in said shank piece, thereby covering the shank portion of the shoe bottom with the upper materials which meet on a line located centrally of said shank portion, and attaching a half sole to the forepart of the shoe bottom.

10. That improvement in methods of making shoes which comprises forming a narrow central groove lengthwise of a shank piece which conforms in outline to the heel and shank portions of a last bottom, attaching the shank piece to an insole and mounting said members on the last bottom with the shank piece exposed, securing the forepart of a multi-ply upper in lasted relation to the insole with staples, the outer layer of said upper being cut fuller than normal at the shank portion of the shoe, securing the opposite margins of the lining at the shank portion of said upper to the shank piece with staples, skiving said margins to a relatively thin edge, applying cement to said lining and to the exposed portion of the shank piece, trimming the opposite margins of the outer layer of the upper so that they will cover the shank piece and enter the groove therein, and pulling said margins over said shank piece and tucking the inner portions thereof into said groove.

11. That improvement in methods of making shoes which comprises forming a central groove longitudinally of the outer surface of a shank piece, cement attaching the shank piece to an insole and mounting the insole on a last with the shank piece exposed, cutting the opposite marginal portions of the outer layer of a multi-ply shoe upper fuller than normal at the shank portion only, securing the forepart of the upper in lasted relation to the insole, permanently securing the opposite sides of the lining of the upper directly to the shank piece with staples, marking the opposite margins of the outer layer of the upper and trimming them in accordance with said marks, securing said margins to the lining and shank piece with cement, and securing the edge portions of said margins in the groove in the shank piece to complete the lasting operation at the sides of the shoe.

12. That improvement in methods of making shoes which comprises shaping a shank piece of relatively inflexible material to conform in outline to the periphery of the shank and heel portions of a last bottom, cutting a longitudinal groove in the central portion of the outer side of said shank piece, cementing the shank piece groove side out to a thin flexible insole, securing the forepart of a shoe upper in lasted relation to said insole, the shank portion of said upper being cut fuller than normal, securing the shank portion of said upper in lasted relation to the shank piece, tucking the surplus material of the upper margins at the shank portion of the shoe into the central groove in the shank piece, thereby covering the shank portion of the shoe bottom with upper material, securing the heel portion of the upper in lasted relation to the shank piece, attaching a short outsole with a narrow shank to the forepart and shank portions of the shoe bottom, and attaching a heel to the shank piece.

13. That improvement in methods of making shoes which comprises forming a central groove in a relatively stiff shank piece which conforms in outline to the rear portion of a last bottom, attaching the shank piece to a flexible forepart member to form a complete sole unit, securing the marginal material at the sides of a shoe upper in lasted relation to said sole unit, and inserting the surplus marginal material at the shank portion of the upper in the groove in said shank piece, thereby covering the shank portion of the shoe bottom with the upper material.

14. That improvement in methods of making shoes which comprises shaping a stiff relatively inflexible shank piece to conform to the periphery of the shank and heel portions of a last bottom, cutting a central groove lengthwise of the outer surface of said shank piece, attaching the shank piece to a flexible forepart to form a full-length sole member, assembling the sole member on a last with a shoe upper cut fuller than normal at the shank portion thereof, securing the upper in lasted relation to the sole member, tucking the excess marginal material at the shank portion of the upper into the groove in the shank piece, and attaching an outsole to the forepart of the shoe bottom.

15. That improvement in methods of making shoes which comprises cutting a narrow groove lengthwise of the central portion of a relatively stiff shank piece which conforms to the shape of the shank and heel portions of a last bottom, cementing the shank piece to a flexible forepart member to form a complete sole unit, securing the forepart of a multi-ply shoe upper in lasted relation to said sole unit with staples, the shank portion of the outer layer of said upper being cut fuller than normal, securing the lining of the shank portion of the upper in lasted relation to the shank piece, skiving the margins of said lining to a thin edge, securing the outer layer of the upper to the lining and shank piece with cement, and securing the marginal portions of said outer layer in the groove in the shank piece to complete the lasting operation.

16. That improvement in methods of making shoes which comprises cutting a central groove longitudinally of a relatively stiff shank piece, attaching the shank piece to a flexible insole member, securing the forepart of a shoe upper in lasted relation to the flexible insole member, the shank portion of said upper being cut fuller than normal, securing the shank portion of the upper in lasted relation to the shank piece, inserting the excess material of the shank portion of the upper into the groove in the shank piece thereby forming a central seam, securing the heel portion of the upper in lasted relation to the shank piece, and attaching an outsole the shank portion of which is considerably narrower than the shank portion of the shoe bottom thereby covering the central seam at said shank portion.

17. That improvement in methods of making shoes which comprises cutting a central groove lengthwise of a relatively stiff shank piece, attaching the shank piece to a flexible insole member to form a complete sole unit, securing the forepart of a shoe upper in lasted relation to the flexible insole member, the shank portion of said upper being cut fuller than normal, lasting the shank and heel portions of the upper directly to the shank piece, securing the excess material of the shank portion of the upper in the central groove in the shank piece, and cement attaching a short outsole to the shoe bottom, said outsole extending only to the heel-breast line of the shoe and having an extremely narrow shank portion.

18. That improvement in methods of making shoes which comprises forming a longitudinal groove in the central portion of a relatively inflexible shank piece which conforms in shape to the periphery of the shank and heel portions of a last bottom, cementing the shank piece grooved side exposed to a thin flexible insole to form a complete sole unit, assembling said sole member on a last with a multi-ply shoe upper, the outer layer of said upper being cut fuller than normal at its shank portion, securing the foreport of the upper in lasted relation to the insole with staples, permanently securing the lining of the shank portion of the upper in lasted relation to the shank piece, working the outer layer of the upper over the lining and shank piece and securing the marginal portions thereof in the groove in said shank piece, lasting the heel portion of the upper directly to the shank piece with tacks which do not extend completely through said shank piece, and cement attaching an outsole which extends only to the heel breast line and is considerably narrower than the shoe bottom at the shank portion thereof.

19. That improvement in methods of making shoes which comprises shaping a relatively stiff shank piece to conform on its outer surface to the depression in the attaching face of a wood heel, forming a groove in the central portion of said shank piece, mounting the shank piece with an insole member on the bottom of a last, securing a shoe upper in lasted relation to the insole member and shank piece, inserting the inner portions of the upper margins at the shank portion thereof into the groove in the shank piece, and attaching a wood heel directly to said shank piece.

20. That improvement in methods of making shoes which comprises shaping a relatively inflexible shank piece to conform on its inner side to a last bottom and on its outer side to the depression in the attaching face of a wood heel, cutting a central groove lengthwise of the outer side of the shank piece from its forward end rearwardly beyond the heel breast line, assembling the shank piece on a last with an insole member and securing the sides of a shoe upper in lasted relation to said insole member and shank piece, securing excess portions of the upper margins at the shank portion of the shoe in the groove in said shank piece, thereby covering the shank portion of the shoe bottom with the upper materials, securing a half sole to the forepart of the shoe bottom, and attaching a wood heel directly to the shank piece.

21. That improvement in methods of making shoes which comprises molding a shank piece from plastic material to form a relatively stiff inflexible member the heel portion of which conforms on its inner side to a last bottom and on its outer side to the cup in a conventional wood heel, cutting a longitudinal groove centrally of the outer side of said shank piece, cement attaching the shank piece to an insole member and mounting them on a last bottom, cutting a shoe upper fuller than normal at its shank portion, securing the upper in lasted relation to the insole member and shank piece, tucking the excess margins at the shank portion of the upper into the groove in the shank piece thereby covering the shank portion of the shoe bottom with the upper material, securing an outsole to the shoe bottom, said outsole extending rearwardly only to the heel-breast line and being considerably narrower at its shank portion than the shoe bottom, and attaching a conventional wood heel directly to the shank piece without a heel-seat fitting operation.

22. That improvement in methods of making shoes which comprises constructing a combination shank piece and counter from relatively inflexible material, forming a central groove lengthwise of the shank piece, assembling the shank piece with an insole and shoe upper on a last, securing the upper in lasted relation to the insole and shank piece, and inserting the inner margins of the shank portion of the upper into the groove in the shank piece.

23. That improvement in methods of making shoes which comprises forming a shank piece with an integral counter portion thereon, cutting a central groove longitudinally of the outer surface of said shank piece, assembling the shank piece with an insole and shoe upper on a last, the shank portion of said upper being cut fuller than normal, securing the upper in lasted relation to the insole and shank piece, and tucking the surplus upper material at the shank portion of the shoe into the groove in the shank piece, thereby covering the shank piece with upper material.

24. That improvement in methods of making shoes which comprises forming a shank piece with an integral counter portion from relatively inflexible material, shaping the outer surface of the shank piece to fit the depression in the attaching face of a wood heel, forming a central groove in the shank piece, assembling it with an insole and shoe upper on a last, securing the upper in lasted relation to the insole and shank piece, inserting the inner portions of the upper margins at the shank portion of the shoe in the groove in the shank piece, and attaching a wood heel directly to the shank piece without a heel-seat fitting operation.

25. That improvement in methods of making shoes which comprises forming a relatively stiff shank piece with an integral counter portion thereon, cutting a central groove longitudinally of the outer surface of said shank piece, said groove extending rearwardly at least to the heel-breast line, assembling the shank piece and an insole with a multi-ply shoe upper on a last, said counter portion being located between the lining and the outer layer of the upper the latter of which is cut fuller than normal at the shank portion of the shoe, securing the upper in lasted relation to the insole at the forepart of the shoe, securing the lining of the upper directly to the shank piece, and pulling the outer layer of the shank portion of the upper over the shank piece and securing the margins thereof in the central groove.

26. A shoe comprising an upper, a sole member and a shank piece, said shank piece having a groove inside the marginal portions of its outer surface and the opposite margins of the upper being tucked into said groove.

27. A shoe comprising an upper, a sole member and a relatively inflexible shank piece, said shank piece conforming in outline to the rear portion of a last bottom and having a central longitudinal groove formed therein in which the opposite margins of the upper at the shank portion of the shoe are inserted, thereby covering that portion of the shoe bottom with upper materials.

28. A shoe comprising an upper, a flexible insole and a relatively stiff shank piece, said shank piece conforming in shape to the shank and heel portions of a last bottom and having a central groove extending longitudinally of its outer surface, and said upper being fuller than normal at the shank portion of the shoe and having the inner portions of its margins tucked into the groove in the shank piece thereby covering said shank piece, and an outsole secured to the forepart of the shoe bottom.

29. A shoe comprising an upper, an insole and a relatively stiff shank piece having a central groove in its outer surface, means securing said upper in lasted relation to the insole and shank piece, the margins of said upper at the shank portion of the shoe being secured within said groove, a half-length outsole secured to the forepart of the shoe bottom, and a heel secured directly to said shank piece.

30. A shoe comprising an upper, an insole, and a shank piece having an integral counter porter formed thereon, said shank piece having a central groove in its outer surface and said upper being cut fuller than normal at the shank portion thereof, means securing the upper in lasted relation to the insole and shank piece, the full portions of the upper at the shank portion of the shoe being secured within said groove thereby covering said shank piece, and a half sole attached to the shoe bottom at the forepart of the shoe.

31. A shoe comprising, in combination, a multi-ply upper, an insole member, an integral shank piece and counter of relatively inflexible material, said shank piece having a central groove formed longitudinally of its outer surface and said upper having the opposite marginal portions of its outer layer cut fuller than normal at the shank portion of the shoe, means securing the upper in lasted relation to the insole and shank piece at the forepart and heel portions of the shoe, means securing the lining of the upper to the shank piece at the shank portion of the shank, the full margins of said outer layer being tucked into and secured within said central groove, an outsole attached by cement to the forepart of the shoe bottom, and a wood heel secured directly to the shank piece.

32. A shank piece comprising a relatively inflexible member having a narrow groove in the central portion of its outer surface, said groove extending longitudinally of said surface to the forward end of the shank piece.

33. A shank piece formed of relatively inflexible material conforming in outline to that of the shank and heel portions of a last bottom and having a narrow groove of substantial depth formed longitudinally of its outer surface, said groove extending from the heel breast line to the forward end of the shank piece.

34. A shank piece comprising a relatively inflexible member shaped to form the shank and heel portions of a shoe bottom and having an integral upstanding flange at its heel portion forming a counter for the shoe, said shank piece having a longitudinal groove formed centrally of its outer surface into which the marginal portions of an overlasted upper may be inserted.

35. A shank piece comprising a relatively stiff member composed of material to which a shoe upper can be directly secured by metallic fastenings, said shank piece conforming in shape to the shank and heel portions of a last bottom and having an integral flange at its heel portion to form a counter for a shoe, the outer surface of said shank piece being shaped to fit the cupped attaching face of a conventional wood heel and having a central longitudinal groove extending rearwardly at least to the heel-breast line of the shoe for receiving the overlasted margins of the shoe upper.

WILLIAM H. NUTT.

CERTIFICATE OF CORRECTION.

Patent No. 2,083,659.   June 15, 1937.

WILLIAM H. NUTT.

It is hereby certified that error appears in the printed specification of the above numbered patent requiring correction as follows: Page 7, first column, line 45-46, claim 30, for "porter" read portion; and that the said Letters Patent should be read with this correction therein that the same may conform to the record of the case in the Patent Office.

Signed and sealed this 20th day of July, A. D. 1937.

Henry Van Arsdale (Seal)   Acting Commissioner of Patents.

ing and the outer layer of the upper the latter of which is cut fuller than normal at the shank portion of the shoe, securing the upper in lasted relation to the insole at the forepart of the shoe, securing the lining of the upper directly to the shank piece, and pulling the outer layer of the shank portion of the upper over the shank piece and securing the margins thereof in the central groove.

26. A shoe comprising an upper, a sole member and a shank piece, said shank piece having a groove inside the marginal portions of its outer surface and the opposite margins of the upper being tucked into said groove.

27. A shoe comprising an upper, a sole member and a relatively inflexible shank piece, said shank piece conforming in outline to the rear portion of a last bottom and having a central longitudinal groove formed therein in which the opposite margins of the upper at the shank portion of the shoe are inserted, thereby covering that portion of the shoe bottom with upper materials.

28. A shoe comprising an upper, a flexible insole and a relatively stiff shank piece, said shank piece conforming in shape to the shank and heel portions of a last bottom and having a central groove extending longitudinally of its outer surface, and said upper being fuller than normal at the shank portion of the shoe and having the inner portions of its margins tucked into the groove in the shank piece thereby covering said shank piece, and an outsole secured to the forepart of the shoe bottom.

29. A shoe comprising an upper, an insole and a relatively stiff shank piece having a central groove in its outer surface, means securing said upper in lasted relation to the insole and shank piece, the margins of said upper at the shank portion of the shoe being secured within said groove, a half-length outsole secured to the forepart of the shoe bottom, and a heel secured directly to said shank piece.

30. A shoe comprising an upper, an insole, and a shank piece having an integral counter porter formed thereon, said shank piece having a central groove in its outer surface and said upper being cut fuller than normal at the shank portion thereof, means securing the upper in lasted relation to the insole and shank piece, the full portions of the upper at the shank portion of the shoe being secured within said groove thereby covering said shank piece, and a half sole attached to the shoe bottom at the forepart of the shoe.

31. A shoe comprising, in combination, a multi-ply upper, an insole member, an integral shank piece and counter of relatively inflexible material, said shank piece having a central groove formed longitudinally of its outer surface and said upper having the opposite marginal portions of its outer layer cut fuller than normal at the shank portion of the shoe, means securing the upper in lasted relation to the insole and shank piece at the forepart and heel portions of the shoe, means securing the lining of the upper to the shank piece at the shank portion of the shank, the full margins of said outer layer being tucked into and secured within said central groove, an outsole attached by cement to the forepart of the shoe bottom, and a wood heel secured directly to the shank piece.

32. A shank piece comprising a relatively inflexible member having a narrow groove in the central portion of its outer surface, said groove extending longitudinally of said surface to the forward end of the shank piece.

33. A shank piece formed of relatively inflexible material conforming in outline to that of the shank and heel portions of a last bottom and having a narrow groove of substantial depth formed longitudinally of its outer surface, said groove extending from the heel breast line to the forward end of the shank piece.

34. A shank piece comprising a relatively inflexible member shaped to form the shank and heel portions of a shoe bottom and having an integral upstanding flange at its heel portion forming a counter for the shoe, said shank piece having a longitudinal groove formed centrally of its outer surface into which the marginal portions of an overlasted upper may be inserted.

35. A shank piece comprising a relatively stiff member composed of material to which a shoe upper can be directly secured by metallic fastenings, said shank piece conforming in shape to the shank and heel portions of a last bottom and having an integral flange at its heel portion to form a counter for a shoe, the outer surface of said shank piece being shaped to fit the cupped attaching face of a conventional wood heel and having a central longitudinal groove extending rearwardly at least to the heel-breast line of the shoe for receiving the overlasted margins of the shoe upper.

WILLIAM H. NUTT.

---

CERTIFICATE OF CORRECTION.

Patent No. 2,083,659.　　　　　　　　　　　　　　　　June 15, 1937.

WILLIAM H. NUTT.

It is hereby certified that error appears in the printed specification of the above numbered patent requiring correction as follows: Page 7, first column, line 45-46, claim 30, for "porter" read portion; and that the said Letters Patent should be read with this correction therein that the same may conform to the record of the case in the Patent Office.

Signed and sealed this 20th day of July, A. D. 1937.

Henry Van Arsdale (Seal)　　　　　　　　　　　　　Acting Commissioner of Patents.

CERTIFICATE OF CORRECTION.

Patent No. 2,083,659.  June 15, 1937.

WILLIAM H. NUTT.

It is hereby certified that error appears in the printed specification of the above numbered patent requiring correction as follows: Page 7, first column, line 45-46, claim 30, for "porter" read portion; and that the said Letters Patent should be read with this correction therein that the same may conform to the record of the case in the Patent Office.

Signed and sealed this 20th day of July, A. D. 1937.

Henry Van Arsdale (Seal)  Acting Commissioner of Patents.